United States Patent [19]

Idogaki et al.

[11] Patent Number: 4,546,338
[45] Date of Patent: Oct. 8, 1985

[54] ROTARY DRIVING APPARATUS

[75] Inventors: Takaharu Idogaki, Okazaki; Hisasi Kawai, Toyohashi; Tooru Kosuda, Okazaki; Kyo Hattori, Susono; Kazuhiro Sakurai, Gotenba, all of Japan

[73] Assignees: Nippon Soken, Inc., Nishio; Toyota Jidosha Kogyo Kabushiki Kaisha, Toyota, both of Japan

[21] Appl. No.: 382,119

[22] Filed: May 26, 1982

[30] Foreign Application Priority Data

Jun. 2, 1981 [JP] Japan ................................ 56-83751

[51] Int. Cl.⁴ .......................... H01F 7/08; F16K 31/04
[52] U.S. Cl. .................................. 335/229; 335/272; 251/129.11; 251/129.12; 137/625.47
[58] Field of Search ................. 251/65, 134, 133, 286; 335/272, 229, 230, 234; 340/815.24; 137/625.47

[56] References Cited

U.S. PATENT DOCUMENTS 2,360,599 10/1944 Volpin ................................ 251/286
4,227,164 10/1980 Kitahara ......................... 335/272 X
4,345,228 8/1982 Idogaki et al. .................. 335/272 X Primary Examiner—Martin P. Schwadron
Assistant Examiner—John S. Starsiak, Jr.
Attorney, Agent, or Firm—Cushman, Darby & Cushman

[57] ABSTRACT

A rotary driving apparatus suitable for use for a flow control valve provided with a rotor valve rotatably mounted in a housing. The rotor valve is connected to a permanent magnet member. The permanent magnet member is arranged adjacent to a pair of diametrically spaced ends of a core on which a coil is wound so that the ends are oppositely magnetized to provide a two pole electric motor, stopper means is provided for allowing limited rotary motion of the rotor between a first position and a second position. The permanent magnet member is so arranged with respect to the ends of the core that a torque is, during the de-energization of the coil, generated in order to engage the stopper means. Thus, the first or second position of the rotor valve is maintained without energization of the coil.

7 Claims, 8 Drawing Figures

Fig. 6
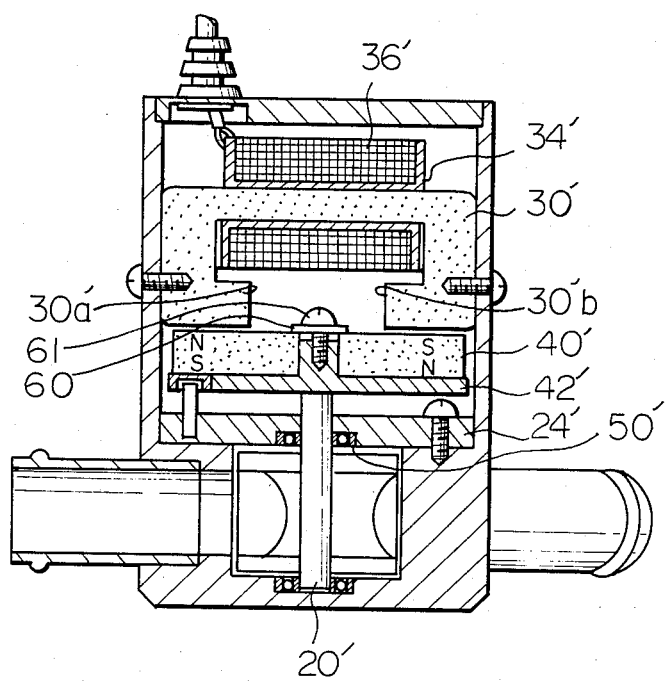
Fig. 7a
Fig. 7b
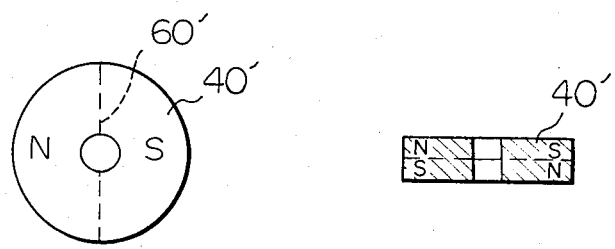

ROTARY DRIVING APPARATUS

BACKGROUND OF THE INVENTION

1. Field of the Invention

The present invention relates to a rotary driving apparatus suitable for use, for example, in a fluid control valve device.

2. Description of the Prior Art

There has heretofore been known a rotary valve device provided with an electromagnetic driving apparatus applying a drive force to the valve body for opening or closing control. During the de-energized condition, a spring acts to keep the valve body in a first position. The supply of an electric current creates an electromagnetic force moving the valve body against the spring to a second position. When the electric current is stopped, the spring acts to return the valve body from the second position to the first position. With such an apparatus, it has been possible to increase the speed of return of the valve body from the second position to the first position by increasing the spring force. The increased spring force, however, means more of a force the electromagnetic force has to overcome when moving the valve body from the first position to the second position, causing decreased speed of valve body movement in that operation. Thus, the prior art has suffered from the drawback that it cannot achieve a quick change of the valve position in both directions.

As a prior art for obtaining better response, there has heretofore been known the use of two coils to eliminate the return spring, as described in Japanese Laid-Open Patent Application No. 55-33041. The use of two coils in the valve housing, however, results in a new disadvantage of increased dimensions of the device.

SUMMARY OF THE INVENTION

An object of the present invention is to provide a rotary driving apparatus of small dimensions, capable of increasing the speed of response while using a single coil and eliminating the use of a return spring.

According to the present invention a rotary driving apparatus is provided, which comprises:
a housing;
a rotor arranged in the housing;
a shaft connected to rotor, provided with axially spaced apart ends;
supporting means for rotatably connecting the shaft to the housing;
a permanent magnet member;
mounting means for mounting the permanent magnet member to the rotor for rotation together;
stopper means for allowing limited rotation of the rotor between first and second positions which are angularly spaced from each other at an angle smaller than 180°;
a core made of magnetic material stationarily arranged on one side of the permanent magnet member remote from the rotor, said core being provided with a pair of diametrically spaced end portions located adjacent to the poles to the permanent magnet; and
coil means for magnetizing, when energized, the portions of the core to become different poles so as to generate a torque for obtaining a desired direction of rotation of the permanent magnet in accordance with the direction of the electric current to be applied to the coil means in order to change-over the rotor between the first and the second positions;
said permanent magnet member being so arranged with respect to the portions of the core so that a residual torque is generated in the permanent magnet member during the de-energization of the coil means for engaging the stopper means to maintain the selected one position of the rotor.

BRIEF DESCRIPTION OF THE DRAWINGS

FIG. 6 shows another embodiment of the present invention;

FIG. 7a shows an upper side view of the permanent magnet in FIG. 6;

FIG. 7b shows a cross-sectional view of the permanent magnet in FIG. 7a.

DETAILED DESCRIPTION OF PREFERRED EMBODIMENTS

Figure 1:
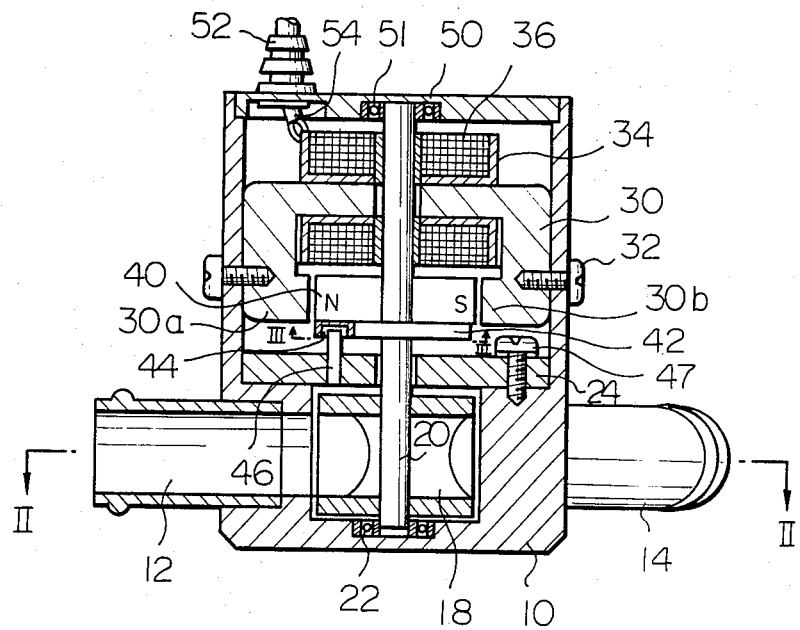
FIG. 1 is a vertical cross-sectional view of a rotor type three port valve device according to the present invention.
Figure 2:
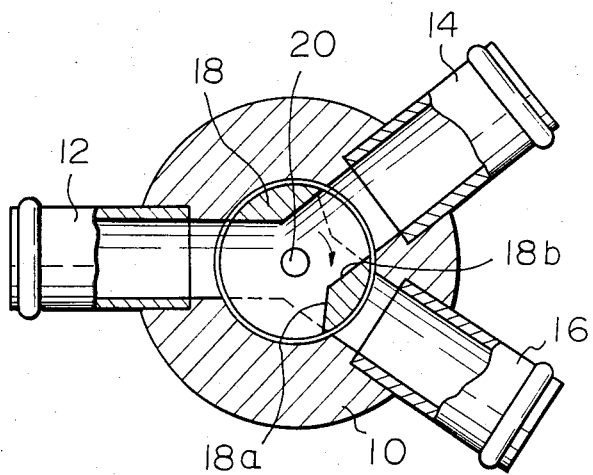
FIG. 2 is a cross-sectional view along the line II—II in FIG. 1.

Referring to the drawings, there is first shown an embodiment of the invention as applied to a three port type change-over valve apparatus of a rotary type. In FIG. 1, reference numeral 10 denotes a valve housing to which three pipes 12, 14, and 16 are connected. A rotor 18 is located in the valve housing 10. A valve shaft 20 is fitted to the rotor 18 along the center axis thereof and is supported at the valve housing 10 by means of a bearing member 22. As shown by FIG. 2, the rotor 18 contains a flared opening 18a and a straight opening 18b communicating with each other. The first pipe 12 is connected to the second pipe 14 via the openings 18a and 18b when the rotor 18 is in the first position, shown by the solid line in FIG. 2. When the rotor 18 is rotated to the second position, shown by the dotted line in FIG. 2, the first pipe 12 is connected with the third pipe 16. A fluid (such as air) in the first pipe 12 connected to a source is, therefore, selectively introduced into the second pipe 14 or third pipe 16 in accordance with the first or second position of the rotor 18.

A device of the present invention for imparting rotating force to the rotor 18 at change-over operation will now be described.

Figure 3:
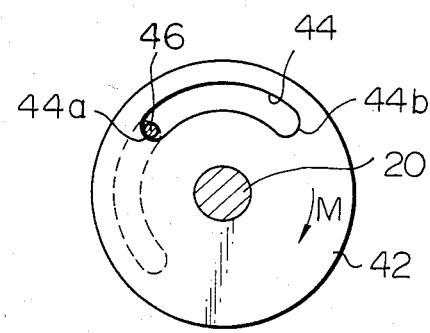
FIG. 3 is a cross-sectional view along the line III—III in FIG. 1.
Figure 4:
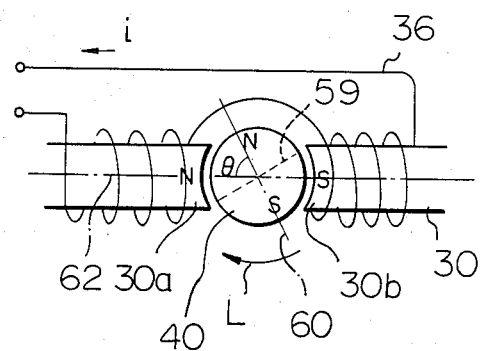
FIG. 4 shows a diagramatic view indicating the operational principle of the present invention.

A core 30 made of a magnetic material is fixedly connected to the valve housing 10 by means of screws 32. Spools 34 are inserted to the core 30, on which spools 34 a coil 36 is wound, as schematically shown by FIG. 4. The core 30 is provided with a pair of interspaced opposite ends 30a and 30b which are magnetized to become different poles. A rotary magnet member 40 made of anistropic ferrite material is arranged between the opposite ends 30a and 30b. As shown by FIG. 4, the rotary magnet member 40 forms a circular disk shape and is provided with oppositely magnetized regions along a diametric line 59 thereof. As shown in FIG. 1, the rotary magnet member 40 rests on a circular support plate 42 which is fixedly connected to the valve shaft 20. The rotary magnet member 40 is bonded to the plate by an adhesive. As shown in FIG. 3, the circular support plate 42 forms an arc shaped slit 44 which extends along the circumference of the plate 42 so as to provide a pair of opposite ends 44a and 44b interspaced from each other at an angle smaller than 180°. A stopper pin 46 is located in the arc shaped slit 44 at its upper end, as shown in FIG. 1. The other, lower end of the stopper pin 46 is fixedly inserted to a valve cover 24 which is fixedly connected to the valve housing 10 by means of a screw 47. Thus, a limited rotational displacement of the valve shaft 20 connected to the rotor 18 is realized between the first position, wherein the stopper pin 46 contacts the slit 44 at its first end 44a, as shown by the solid line in FIG. 3, and the second position, wherein the pin 46 contacts the slit 44 at its second end 44b, as shown by the dotted line in FIG. 3.

An end plate 50 is, at the final step of assembly, press-fitted to the valve housing 10 while a bearing member 51 in the end plate 50 is inserted to the valve shaft 20 at its upper end. A grommet 52 made of rubber is fitted to the end plate 50, to which grommet a lead wire electrically connecting the coil 36 to an electrical source (battery) is inserted.

In FIG. 4, showing diagramatically the operational principle of the present invention, the rotary magnet member 40 is oppositely magnetized along diametric line 59, so that magnetic axis 60 transverse to the diametric line 59 is formed. The opposite ends 30a and 30b are, when the coil 36 is energized, oppositely magnetized in accordance with the directions of the electric current. As a result of this, a two-pole electrical motor is constructed wherein the rotary magnet member 40 is rotated in a selected direction due to a torque occurring in the rotary magnet member in accordance with the direction of the electric current applied to the coil 36. When an electric current is passed through the coil 36, as shown by arrow i in FIG. 4, the first elongated core end 30a is magnetized to become N, while the second elongated end 30b is magnetized to become S. Thus, a torque occurs so as to rotate the rotary magnet member 40 in the clockwise direction. When the direction of the electric current is reversed, a torque is generated so as to rotate the rotary magnet member in the counter-clockwise direction. Due to such movement of the rotary magnet member, the rotor 18 is rotated to change the valve over between the first and the second positions so as to obtain a desired direction of flow of fluid.

It should be noted that even in the de-energized state a torque is generated in the rotary magnet member 40, which torque (below, "residual torque") urges the rotary magnet member to rotate. Therefore, in the energized state, a torque is generated which varies in accordance with the electric current added by the residual torque. The present invention makes it possible to make effective use of the residual torque, as will be fully described hereinbelow.

Figure 5:
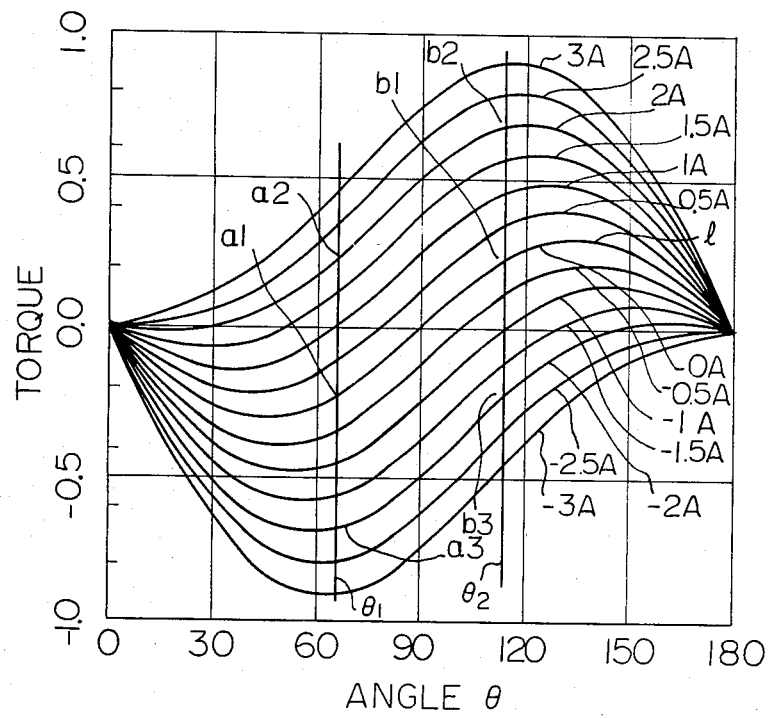
FIG. 5 shows the relationship between rotational angle and torque.

In FIG. 4, $\theta$ indicates an angle between the magnetic axis 60 of the rotary magnet and the magnetic axis 62 of the core 30. The residual torque varies as shown by the curve 1 in FIG. 5 in accordance with the change of values of the angle $\theta$. A positive value torque in FIG. 5 causes the rotary magnet member 40 to rotate clockwise (arrow L in FIG. 4). A negative value torque in FIG. 5 causes the rotary magnet member 40 to rotate counter-clockwise (opposite to arrow L in FIG. 4). Energization generates a torque, including the residual torque, in accordance with the values of the electric current in the coil. In FIG. 5, various curves of torques during indicated values of electric current are shown. The direction of the electric current shown by arrow i in FIG. 4 corresponds to a positive value torque in FIG. 5, causing the generation of a torque urging the rotary magnet member 40 clockwise as shown by arrow L. The direction of the electric current opposite to the direction i corresponds to a negative value torque in FIG. 5, causing the generation of a torque urging the rotary magnet member 40 counter-clockwise and opposite to arrow L.

According to the present invention, the length of the arc shaped slit 44 and the position of the stopper pin 46 located in the slit 44 are so selected that restricted rotary movement in an angle range between $\theta_1$ and $\theta_2$ (FIG. 5) is realized by the rotary magnet member 40 which is connected to the valve shaft 20 as well as the rotor 18. In addition to this, values of $\theta_1$ and $\theta_2$ are so determined to provide a residual torque other than zero value. As is clear from the curve 1 in FIG. 5, a zero value residual torque is attained when $\theta$ is 0°, 90°, and 180°. Thus, $\theta_1$ and $\theta_1$ are so determined to differ from these values. This arrangement provides the herein described advantages of the present invention.

Now, assumed that the rotor 18 is as shown by the solid line in FIG. 2 under the first position, wherein the first pipe 12 is connected to the second pipe 14 and is disconnected from the third pipe 16. In this case, as shown in FIG. 3, the stopper pin 46 contacts the first end 44a of the arc shaped slit 44, shown by the solid line, so as to position the rotor 18 in the first position. This first position corresponds to the angle $\theta_1$ in FIG. 5. Although no electric current is passed through the coil 36, a residual torque indicated by the point $a_1$ is generated in the rotary magnet member 40, urging it to rotate counter-clockwise and opposite to arrow L in FIG. 4. Since the plate 42 in FIG. 3 is viewed from the bottom the plate 42 is rotated in the clockwise direction as shown by an arrow M. The engagement between the end 44a of the slit 44 and the stopper pin 46 prevents further rotation of the plate 42 as indicated in FIG. 1. Thus, the rotor fixedly connected to the plate 42 via the valve shaft 20 is positively restrained in the position shown by the solid line in FIG. 2.

Next, an electric current of, for example, 2A is pulsatively supplied to the coil 36. In this case, the torque indicated by point $a_2$ in FIG. 5 is obtained, urging the plate 42 to rotate opposite to the arrow M in FIG. 4. Since the end 44a of the slit 44 is detached from the pin 46, the shaft effects rotary movement until the second end 44b of the slit 44 contacts the pin 46, as shown by the dotted line in FIG. 3. This dotted line position corresponds to the second position of the rotor 18, wherein the first pipe 12 is connected to the third pipe 16 and is disconnected from the second pipe 14 in FIG. 2. This position also corresponds to the angle $\theta_2$ in FIG. 5, wherein the torque indicated by a point $b_2$ is generated. The change-over of the rotor valve 18 from the first position to this second position is quickly and acceleratedly effected, since the torque increases as the angle $\theta$ increases.

The supply of the electric current to the coil 36 is then stopped (i=0A), whereby the torque decreases from the point $b_2$ to $b_1$ in FIG. 5. However, the torque at the point $b_2$ (residual torque) is still positive and generates a force urging the plate 42 to rotate opposite to the arrow M in FIG. 3. Thus, positive engagement of the end 44b of the slit 44 and the stopper pin 46 is attained to maintain the rotor 18 in the second, dotted line position in FIG. 2.

In order to return the rotor 18 from the second, dotted line position in FIG. 2, to the first, solid line position i.e., rotate from the $\theta_2$ position to the $\theta_1$ position in FIG. 5, an electric current of the direction opposite to the direction i of, for example, −2A is applied pulsatively, so that a negative torque indicated by the point b₃ in FIG. 5 is generated. Thus, the rotary magnet member 40 is rotated opposite to the arrow L in FIG. 4, until the end 44a of the slit 44 contacts the stopper pin 46, as shown by the solid line in FIG. 3, so that the angle $\theta$ becomes $\theta_1$, wherein a negative torque indicated by point a₃ is generated. Since the negative torque increases as the angle $\theta$ decreases, the movement of the rotor is quickly and acceleratedly effected.

When the supply of the electric current is stopped, the negative torque is decreased to a value indicated by the point a₁ in FIG. 5. As already described, the decreased negative torque (residual torque) is, however, enough to maintain the rotor 18 in the first position.

The present invention does not require any return spring for movement of the rotor 18. This leads to the advantage that a high speed of switch-over is attained both from the first to second positions and from the second to first positions. The present invention makes it possible, with the use of the residual torque, to positively maintain the first or second position even if the coil 36 is de-energized. This leads to another advantage of reduced electric power consumption.

In another embodiment, shown in FIG. 6, a shortened valve shaft 20' is rotatably supported on its upper end at a valve cover 24' by means of a bearing unit 50'. A plate 42' is integrally formed on the upper end of the shaft 20' projected out of the valve cover 24'. The plate 42' is provided with a central boss portion to which a rotary magnet member 40' is inserted. The rotary magnet member 40' and the plate 42' are bonded with each other at their facing sides and are mechanically connected with each other by means of a washer 60 and a bolt 61. The rotary magnet member 40' is divided into upper and lower, circular magnetized sections. The upper section is, as shown in FIG. 7a, oppositely magnetized to become N and S poles along a diametric line 60'. The lower section is also oppositely magnetized to become N and S along the line 60'. However, as shown in FIG. 7b, the N section of the lower portion is located below the S section of the upper portion, while the S section of the lower portion is located below the N section of the upper portion. As shown in FIG. 6, a core 30' has a pair of opposite ends 30'a and 30'b which are located above the rotary magnet member 40' in a side by side relation. The core 30' is provided with a spool 34' to which a coil 36' is wound.

The shaft 20' in the embodiment in FIG. 6 terminates at the position of the rotary magnet member 40' and does not pass through the core 30', the spool 34', or the coil 36'.

Thus, the second embodiment is advantageous from the point of view that, no boring of the core or division of the spool is necessary.

The operation of this second embodiment is substantially the same as that of the first embodiment and, therefore, is not described.

The first and the second embodiments are both directed to the application of the present invention to a rotor type change-over valve. However, the present invention may also be applied to butterfly valves and other types of valves. The present invention may also be used in a two port type valve, as opposite to a three port type. Furthermore, the present invention can be used for operating various rotors other than valve rotors. All these are included in the scope of the present invention.

We claim:

1. A rotary driving apparatus comprising:
    a housing;
    a rotor arranged in the housing;
    a shaft connected to the rotor;
    supporting means for rotatably connecting the shaft to the housing;
    a permanent magnet member;
    a first plate member extending transversely with respect to the shaft and fixedly connected to the shaft at an end remote from the rotor, said permanent magnet member being mounted on one side of the plate member remote from the rotor, said permanent magnet member being provided with axially superimposed two disk portions magnetized in mirror fashion along a common diametric line;
    stopper means for allowing limited rotation of the rotor between first and second positions which are angularly spaced from each other at an angle smaller than 180°, said stopper means comprising a second plate member fixedly connected to said housing so as to axially and spacedly face with the other side of said first plate member remote from said magnet member and abutting means arranged between said first and said second plate members for effecting a movement of said first member with respect to said second member in said limited angle range;
    a core made of magnetic material stationarily arranged on one side of the permanent magnet member remote from the rotor, said core being provided with a pair of diametrically spaced end portions located adjacent to the poles to the permanent magnet in a side-by-side relationship; and
    coil means on the core for magnetizing, when energized, the portions of the core to become different poles so as to generate a torque for obtaining rotation of the permanent magnet in a desired direction of accordance with the direction of the electric current to be applied to the coil means in order to change-over the rotor between the first and the second positions;
    said permanent magnet member beng so arranged with respect to the portions of the core so that a residual torque is generated in the permanent magnet member during the de-energization of the coil means for engaging the stopper means to maintain the selected one position of the rotor.

2. A rotary driving apparatus according to claim 1, wherein said abutting means comprises a stopper pin fixedly connected to either the first or second member, the other member being provided with an arc shaped slit provided with circumferentially spaced apart opposite ends, and the pin being inserted into the slit in such a manner that the pin contacts one of the ends in the first position and the other end in the second position.

3. A rotary driving apparatus according to claim 2, wherein said stopper pin is fixedly inserted to the second member so as to provide a free end projectng out from the second member and inserted to the arc shaped slit in the first member.

4. A rotary driving apparatus according to claim 3, wherein said permanent magnet member has a pair of oppositely magnetized regions along a diametric line, said permanent magnet is being arranged between the portions of the core in an end to end relationship.

5. A rotary driving apparatus according to claim 1, wherein said supporting means comprises a pair of bearing units for rotatably connecting the shaft to the housing.

6. A rotary driving apparatus according to claim 5, wherein said shaft terminates at the position of the permanent magnet member, and one of the bearings is connected to said second plate member.

7. A rotary driving apparatus according to claim 6, wherein said shaft passes through the core, and said supporting means is further provided with a plate member connected to the housing, one of the bearings being connected to the plate member.

* * * * *